(12) United States Patent
Clark et al.

(10) Patent No.: US 8,369,779 B2
(45) Date of Patent: Feb. 5, 2013

(54) DEVICE WEARING STATUS DETERMINATION USING RSSI

(75) Inventors: Mark Clark, Aptos, CA (US); Steve Evans, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 250 days.

(21) Appl. No.: 12/603,466

(22) Filed: Oct. 21, 2009

(65) Prior Publication Data

US 2011/0092157 A1    Apr. 21, 2011

(51) Int. Cl.
*H04B 7/00* (2006.01)

(52) U.S. Cl. .................................. 455/41.1; 455/226.2

(58) Field of Classification Search ................. 455/41.1, 455/41.2, 67.11, 67.14, 67.7, 100, 226.1, 455/226.2; 340/539.12, 539.13, 573.1
See application file for complete search history.

(56) References Cited

U.S. PATENT DOCUMENTS

| | | | |
|---|---|---|---|
| 2004/0219890 A1* | 11/2004 | Williams et al. | 455/100 |
| 2009/0322513 A1* | 12/2009 | Hwang et al. | 340/539.12 |

* cited by examiner

*Primary Examiner* — Thanh Le
(74) *Attorney, Agent, or Firm* — Chuang Intellectual Property Law

(57) ABSTRACT

Methods and apparatuses for determining the wearing status of body worn devices are disclosed. In one example, RSSI values are processed to identify the wearing status of a body worn device.

23 Claims, 8 Drawing Sheets

DEVICE WEARING STATUS DETERMINATION USING RSSI

BACKGROUND OF THE INVENTION

The ability to determine whether a body wearable device such as a headset is currently being worn or carried (herein referred to as "donned") by the user is useful in a variety of contexts. For example, whether a user's headset is donned as opposed to placed on a stationary surface (herein referred to as "ditched") indicates the user's ability or willingness to communicate, often referred to as user "presence". User presence is increasingly important as the methods, devices, and networks by which people may communicate, at any given time or location, proliferate. Presence information is gathered and reported in network communication systems by unified communications (UC) applications and services.

As applied to the field of headsets, presence information may include, for example, whether the headset is being worn by the user, whether the headset is being carried by the user, the proximity of the user to the base station, other usage information related to the headset, and whether the user desires to be called. The determination of whether a user's headset is donned is also useful in a variety of other contexts in addition to presence.

As a result, improved methods and apparatuses for determining the wearing status of a body-wearable device are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
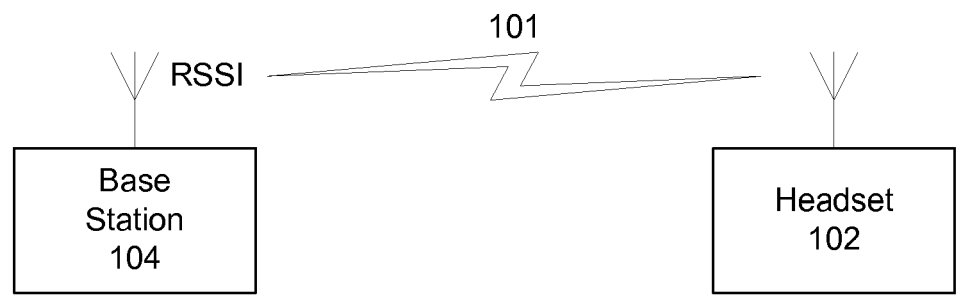
FIG. 1 illustrates donned/ditched sensing of a headset utilizing RSSI in one example.

Methods and apparatuses for device wearing status determination utilizing RSSI are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to wearing status determination solutions for body-worn devices, such as wireless headsets. In the prior art, wearing status determination solutions have used sensors such as capacitive sensors with support circuitry and microprocessor control to detect whether the headset is in a donned state. The sensors and support circuitry require PCB space and add significant cost to implement.

The inventors have recognized that while sensors may be utilized to determine wearing status, existing RSSI data may also be used to make this determination. This is advantageous because RSSI measurements are already made in many wireless devices to determine connection quality. For example, the DECT protocol requires that RSSI measurements be made on a periodic basis. Thus, RSSI data is readily available.

In one example of the invention, variations in the RSSI signal are detected by the headset firmware to determine if the headset is currently being worn or not. When the headset is docked in a charging cradle or laying on the user's desk the RSSI is very stable. When the headset is being worn or carried, even if the user is very still, there are identifiable variations in the RSSI signal level indicating a worn state. Firmware algorithms that analyze the RSSI level over a time period allow detection that the user's headset is donned or ditched. In one example, the headset communicates changes in the donned/ditched state to a base unit. The base unit then communicates these changes to a host presence software to update the user's presence information. In this manner, donned and ditched status are determined without the need for additional headset sensors or circuitry.

In one example, a method for determining a body worn device donned status or a body worn device ditched status includes receiving a plurality of RSSI values, determining a RSSI variation in the plurality of RSSI values, and comparing the RSSI variation to a donned/ditched threshold RSSI variation. The method further includes generating a donned status or a ditched status indication responsive to comparing the RSSI variation to the donned/ditched threshold RSSI variation.

In one example, a body worn device includes a wireless transceiver for sending and receiving signals, a processor, and a memory storing a donned/ditched application program for determining a donned status or a ditched status of the body worn device. The donned/ditched application program is operable to process a plurality of RSSI values, where a RSSI variation in the plurality of RSSI values is identified to generate a donned status or ditched status indication.

In one example, a device in communication with a wireless headset includes a network interface, a wireless transceiver for sending and receiving signals, a processor, and a memory storing a donned/ditched application program for determining a donned status or a ditched status of a wireless headset. The donned/ditched application program is operable to process a plurality of RSSI values, where a RSSI variation in the plurality of RSSI values is identified and compared to a donned/ditched threshold RSSI variation to generate a donned status or ditched status indication.

In one example, a computer readable medium storing executable program instructions that when executed by a computer cause the computer to perform a method for determining the wearing status of a body worn device. The method includes receiving a plurality of RSSI data, processing the plurality of RSSI data to determine a RSSI variation in the plurality of RSSI data, comparing the RSSI variation to a threshold RSSI variation, and generating a wearing status indication responsive to comparing the RSSI variation to the threshold RSSI variation.

FIG. 1 is a drawing illustrating how RSSI may be employed to determine a donned status or ditched status of a body worn device, in accordance with an aspect of the present invention. Although certain examples described herein refer to a headset, the apparatus and methods described are also applicable to other body worn or carried devices such as mobile phones.

Referring now to FIG. 1, a system 100 includes a headset 102 and a base station 104 capable of wireless communication there between. Base station 104 is coupled to a telecommunications network. In one example, base station 104 is an access point (AP), which is operably coupled with a network. The network may be a communications network which may include a public switched telephone network (PSTN), a cellular network, an integrated services digital network (ISDN), a local area network (LAN), and/or a wireless local area network (WLAN), that support standards such as Ethernet, wireless fidelity (WiFi), and/or voice over internet protocol (VoIP). In one example, the access point includes a transceiver and a processor configured to allow a wireless device (e.g., headset 102) access to a network connected to the access point (e.g., via a 10/100 Ethernet RJ-45 port). The access point may be any device that allows wireless-equipped computers and other devices to communicate with a wired network. In one example, the access point is able to support WiFi in general, and the 802.11a, 802.11b, and/or 802.11g wireless networking standards in particular. In other examples, the access point may be able to support other wireless networking standards.

The received signal strength indicator (RSSI) of a wireless link 101 is measured and monitored over time to determine the donned/ditched status of a headset 102. The RSSI measurements can be monitored either at the headset 102 or at a base station 104. If measured and monitored at the base station 104, the headset 102 can be configured to query the base station 104 as to what the RSSI is. If measured and monitored at the headset 102, the base station 104 can be configured to query the headset 102 as to what the RSSI is. In one example, the RSSI measurements are processed at the headset 102 to determine the headset donned/ditched status. In a further example, the RSSI measurements are processed at the base station 104 to determine the headset donned/ditched status. As used herein, the term "donned" refers to a usage scenario where the user is either wearing the headset in proximity to the user ear or otherwise carrying or wearing the headset on his body. The term "ditched" refers to a usage scenario where the user is not carrying or wearing the headset on his body, such as when the user has placed the headset on a table or in a base station.

Figure 2:
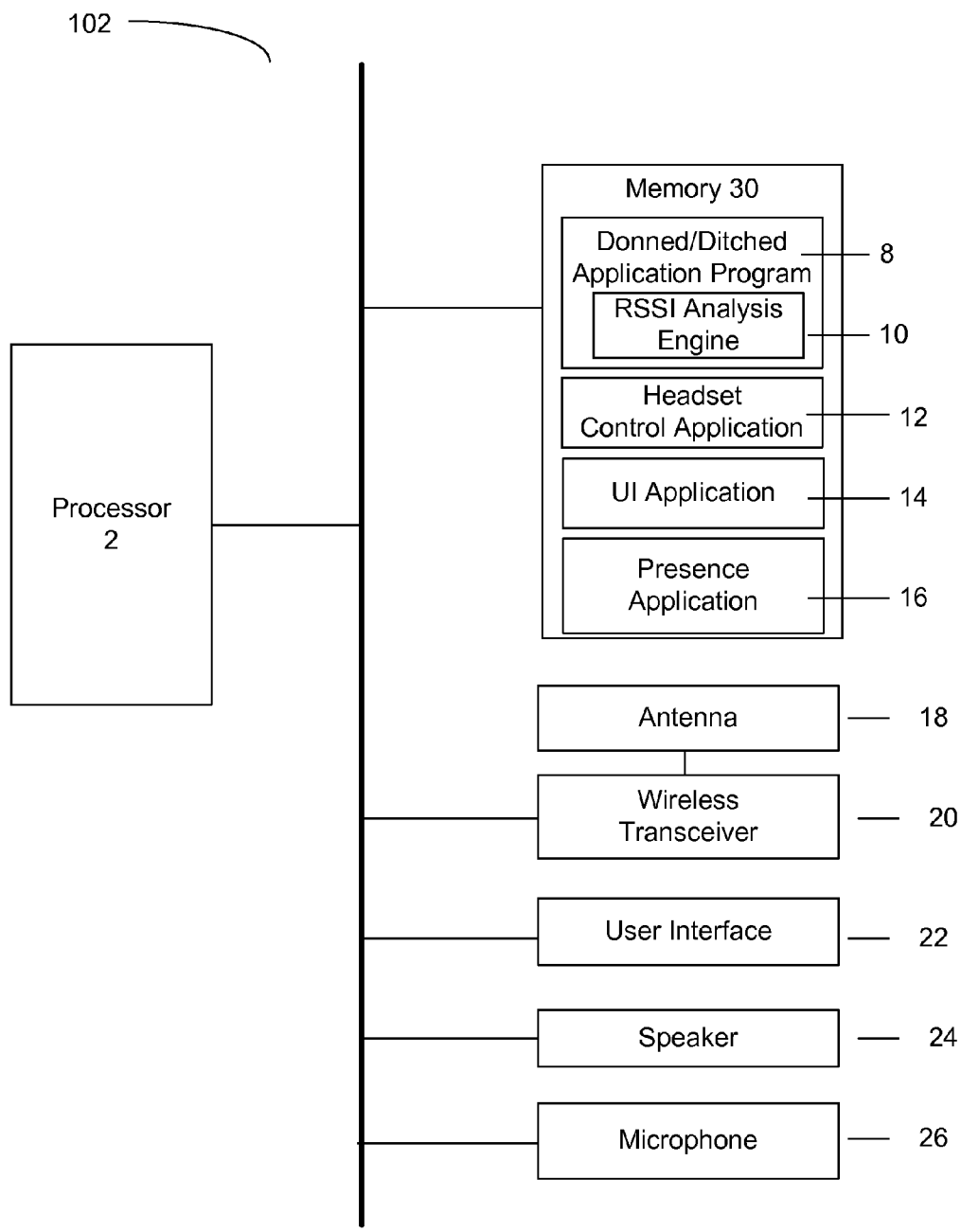
FIG. 2 illustrates a block diagram of a headset with a donned/ditched determination application.

FIG. 2 illustrates a block diagram of a headset with a donned/ditched determination application. Referring now to FIG. 2 in conjunction with FIG. 1, a block diagram of an example of headset 102 is shown. Headset 102 includes a processor 2 operably coupled to a memory 30, a wireless transceiver 20 and accompanying antenna 18, a user interface 22, a speaker 24, and a microphone 26. Wireless transceiver 20 may, for example, be a DECT transceiver, Bluetooth transceiver, or IEEE 802.11 transceiver.

Processor 2 allows for processing data, in particular managing RSSI data between wireless transceiver 20 and memory 30 for determining the donned/ditched status of headset 102. In one example, processor 2 is a high performance, highly integrated, and highly flexible system-on-chip (SOC) having signal processing functionality. Processor 2 may include a variety of processors (e.g., digital signal processors), with conventional CPUs being applicable.

Memory 30 may include a variety of memories, and in one example includes SDRAM, ROM, flash memory, or a combination thereof. Memory 30 may further include separate memory structures or a single integrated memory structure. In one example, memory 30 may be used to store passwords, network and telecommunications programs, and/or an operating system (OS).

Memory 30 stores a donned/ditched application program 8 executed by processor 2 to determine donned/ditched status of the headset 102. Donned/ditched application program 8 includes an RSSI analysis engine 10. Utilizing RSSI analysis engine 10, donned/ditched application program 8 is operable to process a plurality of RSSI values, where a RSSI variation in the plurality of RSSI values is identified to generate a donned status or ditched status indication. In one example, the RSSI variation in the plurality of RSSI values is identified and compared to a donned/ditched threshold RSSI variation, where the donned/ditched threshold RSSI variation is a value above which the headset is in a donned status and below which the headset is in a ditched status. Memory 30 may store RSSI values and predetermined donned/ditched RSSI threshold variation values for use by donned/ditched application program 8 to determine the donned/ditched status of headset 102.

Memory 30 also includes a headset control application 12, and user interface application 14. In one example, memory 30 may also include a presence application 16 for sampling and/or reporting presence information, such as a user availability to communicate, to a presence server. User interface 22 allows for manual communication between the headset user and the headset, and in one example includes an audio and/or visual interface such that a prompt may be provided to the user's ear and/or an LED may be lit.

The donned/ditched application program 8 may implement a variety of algorithms to process the RSSI data to identify a donned or ditched status. In a first example, a standard deviation methodology is used:

$$\sigma = \sqrt{\frac{\sum_{n=0}^{n=tn}(x-m)^2}{n}}$$

σ=standard deviation of the RSSI values
x=sample taken at to
m=mean of samples from $t_n=0$ to $t_n=K$ n=number of samples from $t_n=0$ to $t_n=K$
Q=reference threshold
σ>Q=donned
σ<Q=ditched In this formula, for a time period, where t=0 is the present instant, indexed by n backward in time, each index increment being N frames, and where $X_n$ is the RSSI value at the $t_n$, for n=0 to n=K, the standard deviation of the series $X_0$ to $X_K$ is calculated. The standard deviation sigma of the RSSI value sample series is compared with a threshold Q, and if sigma is greater than the threshold Q, the headset status is donned. Otherwise the headset status is doffed. In one example, the reference threshold Q is determined empirically.

In a second example, a methodology utilizing a variance of a series is used:

$$\sigma = \frac{\sum_{n=0}^{n=tn}(x-m)^2}{n}$$

σ=variance of the RSSI values
x=sample taken at to
m=mean of samples from $t_n=0$ to $t_n=K$
n=number of samples from $t_n=0$ to $t_n=K$
Q=reference threshold
σ>Q=donned
σ<Q=doffed In this second example, the process of the first example is followed except that the variance of the series is calculated instead of the standard deviation. This advantageously avoids the calculation of the square root required for the standard deviation, thereby requiring less processing power and enabling a faster donned/ditched determination.

In a third example, a methodology utilizing an average of the absolute value of the difference of the samples in the series is used:

$$\sigma = \frac{\sum_{n=0}^{n=tn}|x-m|}{n}$$

σ=reference RSSI value
x=sample taken at tn
m=mean of samples from $t_n=0$ to $t_n=K$
n=number of samples from $t_n=0$ to $t_n=K$
Q=reference threshold
σ>Q=donned
σ<Q=doffed In this third example, the process of the first example is followed except that the average of the absolute value of the difference of the samples in the series from the average of all the samples is calculated instead of the standard deviation. This advantageously avoids the requirement for multiplication required for the calculation of the variance, thereby requiring less processing power and enabling a faster donned/ditched determination.

In a fourth example, the process of the first example is followed except that the threshold Q is scaled by a function of the average of the RSSI samples series. This accounts for the increase in RSSI variability if the headset is at some distance from the base, even if it is ditched, due to the larger path length. The function is operably nonlinear in such a way that a headset which is near the edge of range is not considered to be determinably donned or ditched, a second output of the algorithm operating to report that the headset is near the edge of range. The edge of range data is reported to the system so that the reduction in accuracy of the donned/ditched state can also be reported.

In one example, the wireless headset 102 further includes a sensor for outputting a sensor signal that is processed to determine a headset donned status indicating in particular whether the headset is being worn on the user ear. For example, the sensor may be an infra-red detector, a pyroelectric sensor, a capacitance sensor, a micro-switch, an inductive proximity switch, a skin resistance sensor, and at least two pyroelectric sensors for determining a difference in temperature readings from the two pyroelectric sensors. The wireless headset 102 utilizes the sensor to determine the donned/doffed status as described in the commonly assigned and co-pending patent application entitled "Donned and Doffed Headset State Detection", application Ser. No. 11/542,385, which was filed on Oct. 2, 2006, and which is hereby incorporated into this disclosure by reference for all purposes. Used in conjunction with RSSI analysis described herein, the status of a headset 102 having the sensor can be determined indicating the headset 102 is being worn on the user ear, not being worn on the user ear but being carried by the user, or ditched.

Figure 3:
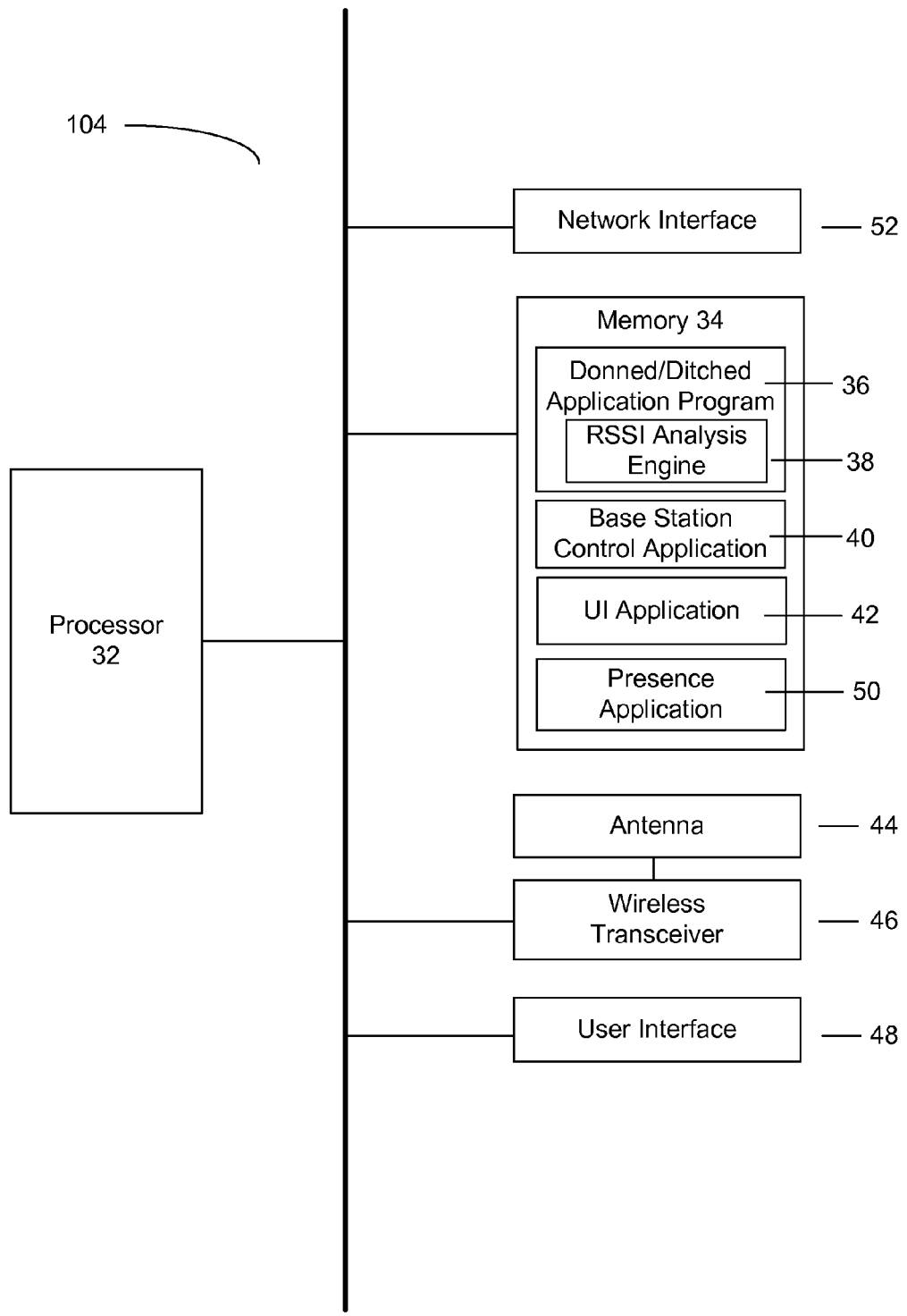
FIG. 3 illustrates a block diagram of a base station with a donned/ditched determination application.

FIG. 3 illustrates a block diagram of a base station 104 with a donned/ditched application program 36. FIG. 3 is meant to illustrate that the donned/ditched application program 36 can reside on either the headset as shown in FIG. 2, or on the base station, as shown in FIG. 3. Regardless of where the donned/ditched application program 36 resides, the result of a donned/ditched determination may be sent to the other device. In a further example, both a headset and a base station have a donned/ditched determination application. Furthermore, RSSI values can be measured at either the headset 102 or the base station 104.

Referring now to FIG. 3 in conjunction with FIG. 1, a block diagram of an example of base station 104 is shown. Base station 104 includes a processor 32 operably coupled to a memory 34, a wireless transceiver 46 and accompanying antenna 44, a network interface 52, and a user interface 48. Wireless transceiver 46 may for example, be a DECT transceiver, Bluetooth transceiver, or IEEE 802.11 transceiver. The network interface 52 may for example, be an interface to a public switched telephone network, integrated services digital network, local area network, or wireless local area network.

Processor 32 allows for processing data, in particular managing RSSI data between wireless transceiver 46 and memory 34 for determining the donned/ditched status of base station 104. In one example, processor 32 is a high performance, highly integrated, and highly flexible system-on-chip (SOC) having signal processing functionality. Processor 32 may include a variety of processors (e.g., digital signal processors), with conventional CPUs being applicable.

Memory 34 may include a variety of memories, and in one example includes SDRAM, ROM, flash memory, or a combination thereof. Memory 34 may further include separate memory structures or a single integrated memory structure. Memory 34 stores a donned/ditched application program 36 executed by processor 32 to determine donned/ditched status of the headset 102. Donned/ditched application program 36 includes an RSSI analysis engine 38. Memory 34 may store RSSI values and predetermined donned/ditched RSSI threshold variation values for use by donned/ditched application program 36 to determine the donned/ditched status of headset 102. Donned/ditched application program 36 processes RSSI signals in a manner similar to that of donned/ditched application program 8 described previously.

Memory 34 also includes a base station control application 40 and a user interface application 42. User interface 48 allows for manual communication between the base station user and the base station, and in one example includes an audio and/or visual interface. In one example, memory 34 may also include a presence application 50 for sampling and/or reporting presence information, such as a user availability to communicate, to a presence server.

Figure 4A:
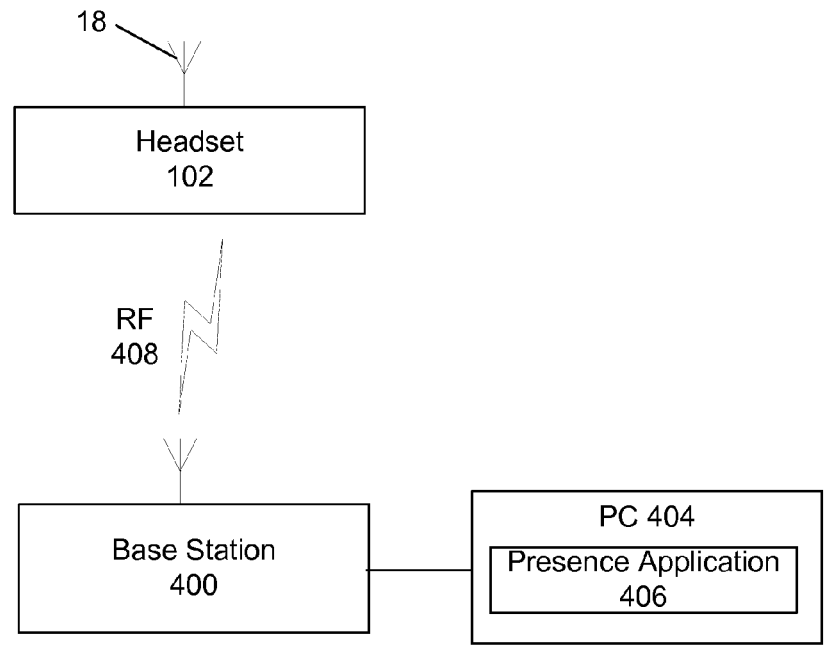
FIG. 4A illustrates a system for donned/ditched sensing of the headset shown in FIG. 2 in one example implementation.
Figure 4B:
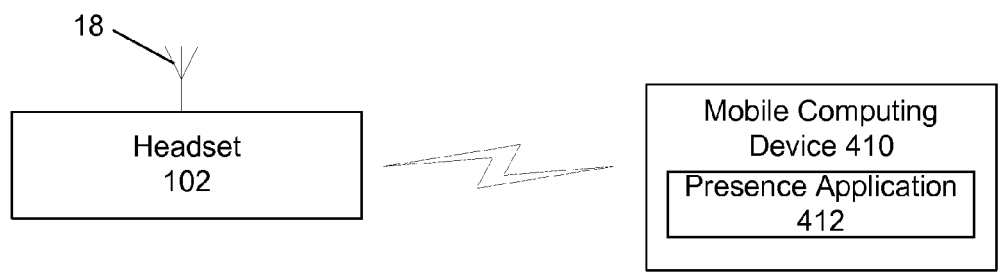
FIG. 4B illustrates a system for donned/ditched sensing of the headset shown in FIG. 2 in a further example implementation.

FIG. 4A illustrates a system for donned/ditched sensing of the headset 102 shown in FIG. 2 in one example implementation. FIG. 4B illustrates a system for donned/ditched sensing of the headset 102 shown in FIG. 2 in a further example implementation. Referring to FIG. 4A, a base station 400 is coupled to a computer 404 (also referred to herein as a "PC" for convenience, though computer 404 may be any type of computing device) executing a presence application 406. In one example, base station 400 is coupled to personal computer 404 using a USB interface. Presence application 406 may be configured to communicate usage state information of the headset 102 over a network to which personal computer 404 is connected. The usage state information may, for example, include the donned/ditched status of headset 102 as determined from RSSI values of RF link 408 using the methods described herein.

Figure 7A:
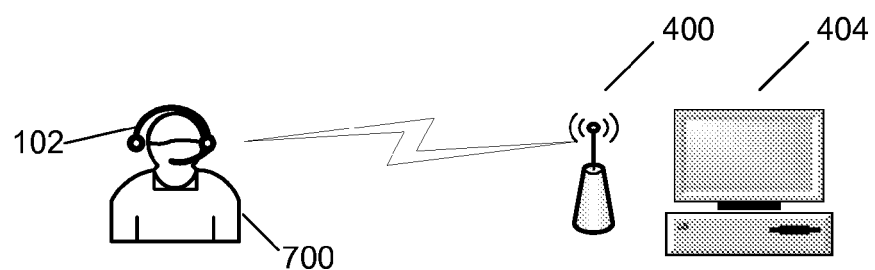
FIG. 7A is a drawing illustrating a usage state in which the headset shown in FIG. 2 is donned by a user, in accordance with an aspect of the present invention.
Figure 7B:
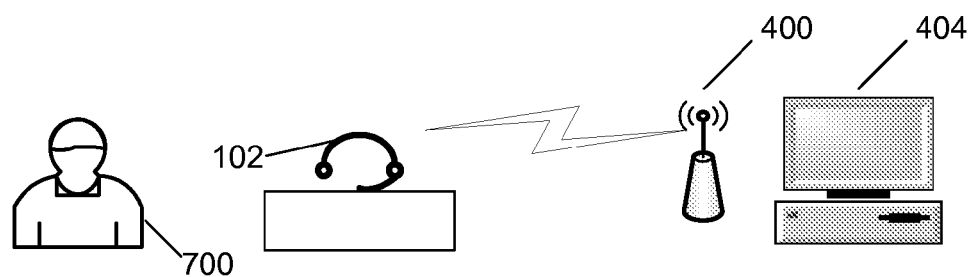
FIG. 7B is a drawing illustrating a usage state in which the headset shown in FIG. 2 is ditched, in accordance with an aspect of the present invention.

FIG. 7A is a drawing illustrating a usage state in which the headset 102 shown in FIG. 4A is donned by a user, in accordance with an aspect of the present invention. It is determined that the wireless headset 102 is donned by a user 700 utilizing RSSI processing techniques described herein. FIG. 7B is a drawing illustrating a usage state in which the headset 102 shown in FIG. 4A is ditched, but is within range of the base station 400, in accordance with an aspect of the present invention. This usage state may occur, for example, if the wireless headset 102 is resting on a desk or table, yet is powered on and within range of the base station 400. It is determined that the wireless headset 102 is ditched by a user 700 utilizing RSSI processing techniques described herein.

As shown in FIG. 4B, in a further example, the personal computer 404 may be replaced with a mobile computing device 410, such as a mobile handset, executing presence application 412, whereby the mobile computing device 410 is connected to a WiFi, cellular, or other wireless network.

Figure 8A:
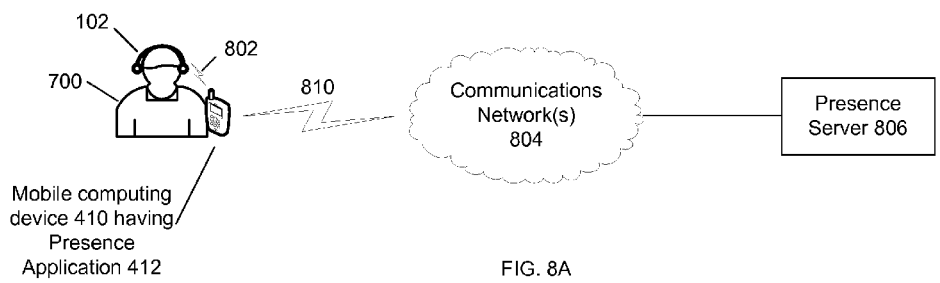
FIG. 8A is a drawing illustrating how a mobile computing device having a presence application may be configured to communicate usage state information of a headset over communication networks to a presence server, in accordance with an embodiment of the present invention.
Figure 8B:
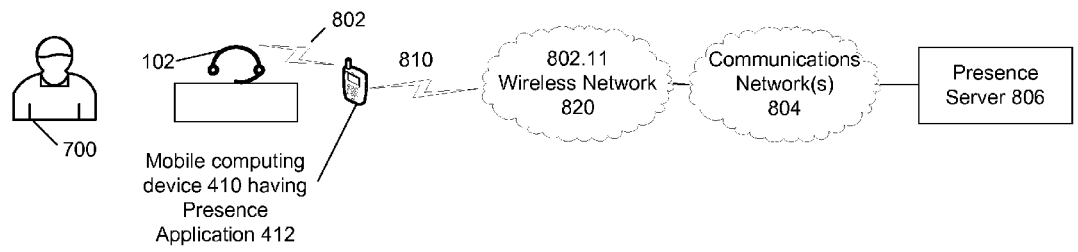
FIG. 8B is a drawing illustrating how a mobile computing device having a presence application may be configured to communicate usage state information of a headset over an 802.11 network and subsequent communication networks to a presence server, in accordance with an embodiment of the present invention.

FIG. 8A is a drawing illustrating how the mobile computing device 410 shown in FIG. 4B having a presence application may be configured to communicate usage state information of a headset over communication networks to a presence server, in accordance with an embodiment of the present invention. FIG. 8B is a drawing illustrating how the mobile computing device shown in FIG. 4B having a presence application may be configured to communicate usage state information of a headset over an 802.11 network and subsequent communication networks to a presence server, in accordance with an embodiment of the present invention.

Referring to FIG. 4B and FIG. 8A, mobile computing device 410 (e.g., a smart phone, personal digital assistant (PDA), laptop computer, etc.) is configured to include a presence application. For example, FIG. 8A illustrates how a mobile computing device 410 having a presence application 412 may be configured to communicate usage state information of the headset 102 over communication network(s) 804 to other system users. Communication network(s) 804 may be one or more networks, including cellular networks and the Internet.

A communication link (e.g., a Bluetooth link) 802 between the headset 102 and the mobile computing device 410 is used to transfer usage state information of the headset 102 to the presence application 412, which formats the information in a manner suitable for communicating the information to communication network(s) 804 over a second wireless link 810, and ultimately to the other system users via a presence server 806.

Those of ordinary skill in the art will readily appreciate and understand that the presence application 412 may be adapted to communicate the usage information over other types of networks. FIG. 8B shows how the usage information of the headset 102 may be communicated to an 802.11 network 820, which is adapted to forward the information to other system users via communications network(s) 804 and a presence server 806. Further details regarding use of presence applications can be found in the commonly assigned and co-pending U.S. patent application entitled "Headset-Derived Real-Time Presence and Communication Systems and Methods", application Ser. No. 11/697,087, which was filed on Apr. 5, 2007, and which is hereby incorporated into this disclosure by reference for all purposes.

Figure 5:
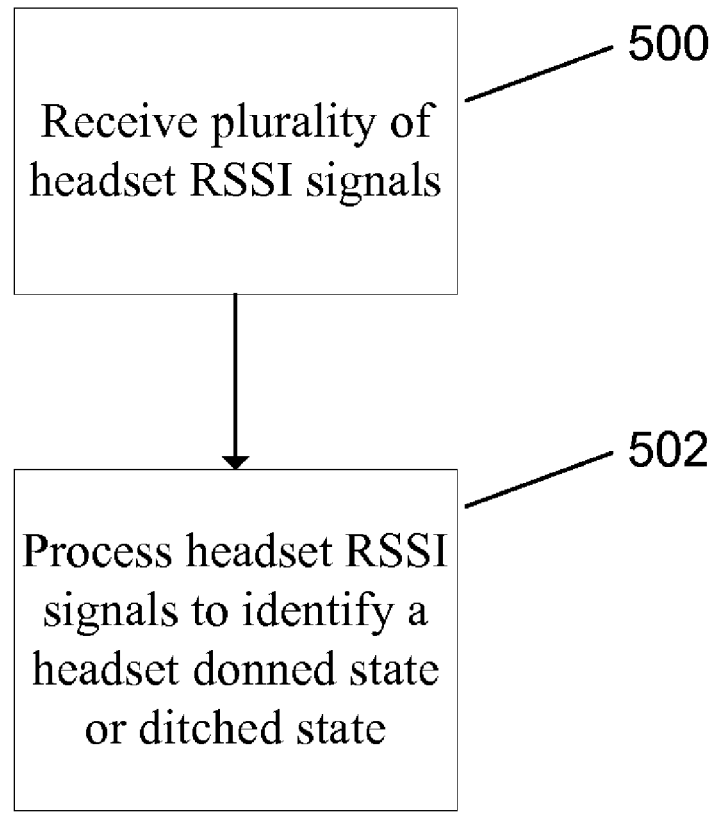
FIG. 5 is a flow diagram illustrating a process for identifying a headset donned state or ditched state utilizing RSSI in one example.

FIG. 5 is a flow diagram illustrating a process for identifying a headset donned state or ditched state utilizing RSSI in one example. At block 500, a plurality of headset RSSI signals are received. At block 502, the plurality of headset RSSI signals are processed to identify a headset donned state or a headset ditched state. In an example where a sensor, such as a capacitive sensor, is utilized in addition to the RSSI values, the process may further include receiving an additional signal from the dedicated sensor and processing the additional signal in addition to the RSSI values to determine a headset donned state on the user ear, a headset donned state not on the user ear, or a headset ditched state. In one configuration, both the additional signal from the sensor and the RSSI values must indicate a donned state to indicate a headset donned state.

Figure 6:
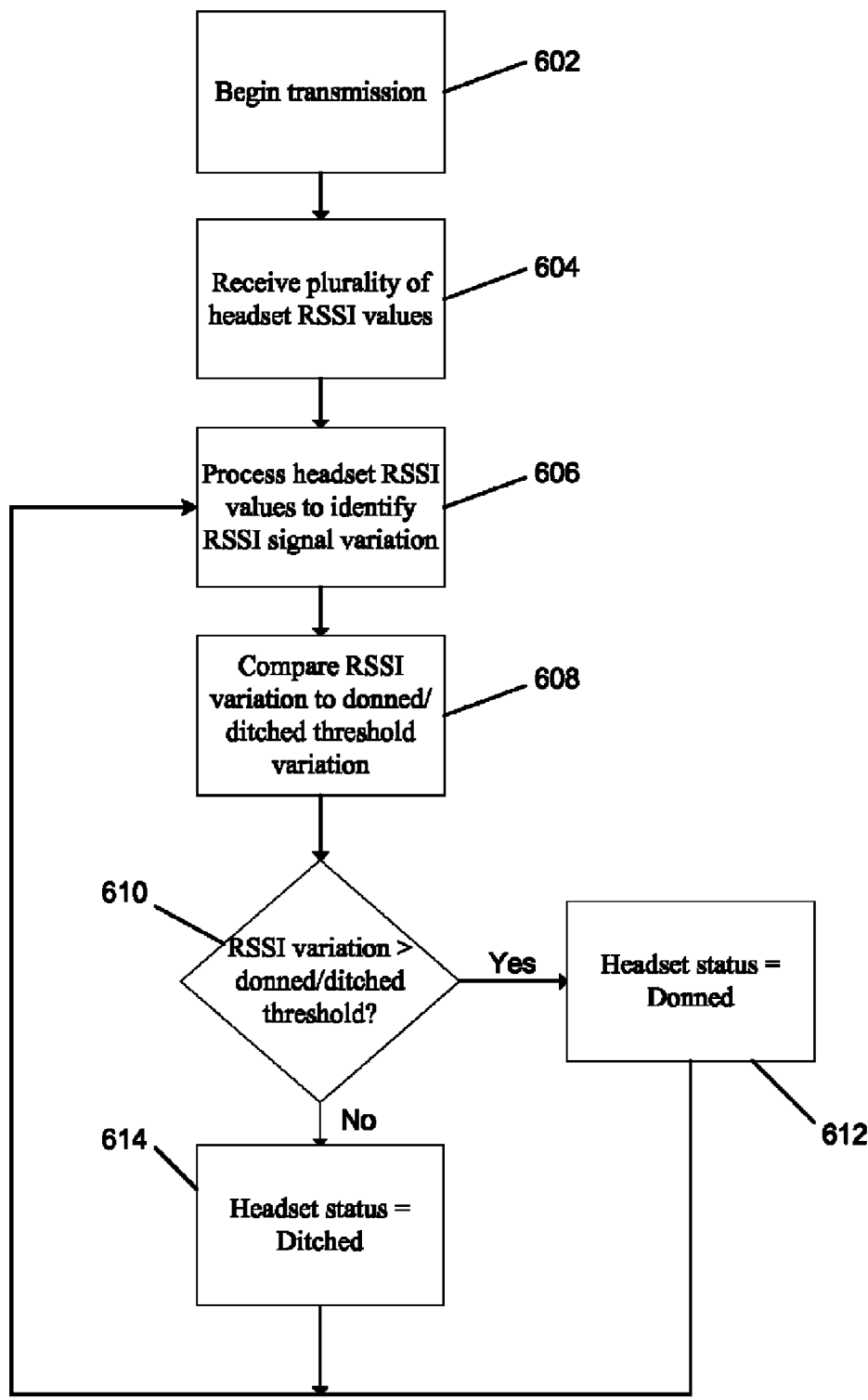
FIG. 6 is a flowchart illustrating a process for identifying a headset donned state or ditched state utilizing RSSI in a further example.

FIG. 6 is a flowchart illustrating a process for identifying a headset donned state or ditched state utilizing RSSI in a further example. At block 602, transmission between a headset and a device such as a base station or mobile phone begins. At block 604, a plurality of headset RSSI values are received. In one example, the plurality of RSSI values are measured at either the headset or the device. At block 606, the headset RSSI values are processed to identify a RSSI variation. The RSSI variation may be determined in several ways. In one example, determining a RSSI variation in the plurality of RSSI values involves determining a standard deviation in the plurality of RSSI values. In a further example, determining a RSSI variation in the plurality of RSSI values involves determining a variance in the plurality of RSSI values. In a further example, determining a RSSI variation in the plurality of RSSI values involves determining an average of the absolute value of the difference of the RSSI values from an average of all the RSSI values.

At block 608, the RSSI variation is compared to a donned/ditched threshold RSSI variation. In one example, the donned/ditched threshold RSSI variation is a value above which the headset is in a donned status and below which the headset is in a ditched status. At decision block 610, it is determined if the RSSI variation is greater than the donned/ditched threshold RSSI variation. If yes at decision block 610, at block 612 the headset is assigned a donned status. If no at decision block 610, at block 614 the headset is assigned a ditched status. The process then returns to block 604.

In one example, the method further includes receiving a sensor signal from a dedicated donned/doffed sensor and processing the sensor signal together with the plurality of RSSI values to determine a headset donned state on the user ear, a headset donned state not on the user ear, or a headset doffed state. In one example, generating a donned status or donned status indication responsive to comparing the RSSI variation to the donned/ditched threshold RSSI variation employs a hysteresis to prevent rapid toggling between donned status and ditched status.

While the exemplary embodiments of the present invention are described and illustrated herein, it will be appreciated that they are merely illustrative and that modifications can be made to these embodiments without departing from the spirit and scope of the invention. For example, RSSI processing techniques described herein may be embodied in other devices in addition to headsets. Although certain examples are set forth specifying RSSI processing techniques to identify a headset donned state or ditched state, other techniques may be employed in further examples of the invention. Thus, the scope of the invention is intended to be defined only in terms of the following claims as may be amended, with each claim being expressly incorporated into this Description of Specific Embodiments as an embodiment of the invention.

What is claimed is:

1. A method for determining a body worn device donned status or a body worn device ditched status comprising:
   receiving a plurality of RSSI values;
   determining a RSSI variation in the plurality of RSSI values;
   comparing the RSSI variation to a donned/ditched threshold RSSI variation; and
   generating a donned status or a ditched status indication responsive to comparing the RSSI variation to the donned/ditched threshold RSSI variation.

2. The method of claim 1, wherein the plurality of RSSI values are measured at either a body worn device or a body worn device base station.

3. The method of claim 1, wherein the donned/ditched threshold RSSI variation is a value above which the body worn device is in a donned status and below which the body worn device is in a ditched status.

4. The method of claim 1, wherein the body worn device is a headset.

5. The method of claim 1, further comprising receiving a sensor signal from a dedicated donned/ditched sensor and processing the sensor signal together with the plurality of RSSI values to determine a body worn device donned state or a body worn device ditched state.

6. The method of claim 1, wherein determining a RSSI variation in the plurality of RSSI values comprises determining a standard deviation in the plurality of RSSI values.

7. The method of claim 1, wherein determining a RSSI variation in the plurality of RSSI values comprises determining a variance in the plurality of RSSI values.

8. The method of claim 1, wherein determining a RSSI variation in the plurality of RSSI values comprises determining an average of an absolute value of the difference of the RSSI values from an average of all the RSSI values.

9. The method of claim 1, wherein the donned/ditched threshold RSSI variation is scaled by a function of the average of the plurality of RSSI values.

10. A body worn device comprising:
    a wireless transceiver for sending and receiving signals;
    a processor; and
    a memory storing a donned/ditched application program for determining a donned status or a ditched status of the body worn device, the donned/ditched application program operable to process a plurality of RSSI values, wherein a RSSI variation in the plurality of RSSI values is identified to generate a donned status or ditched status indication.

11. The body worn device of claim 10, further comprising a sensor comprising one selected from the group consisting of an infra-red detector, a pyroelectric sensor, a capacitance sensor, a micro-switch, an inductive proximity switch, a skin resistance sensor, and at least two pyroelectric sensors for determining a difference in temperature readings from the two pyroelectric sensors.

12. The body worn device of claim 10, wherein the wireless transceiver comprises a DECT transceiver, Bluetooth transceiver, or IEEE 802.11 transceiver.

13. A device in communication with a wireless headset comprising:
    a network interface;
    a wireless transceiver for sending and receiving signals;
    a processor; and
    a memory storing a donned/ditched application program for determining a donned status or a ditched status of a wireless headset, the donned/ditched application program operable to process a plurality of RSSI values, wherein a RSSI variation in the plurality of RSSI values is identified and compared to a donned/ditched threshold RSSI variation to generate a donned or ditched status indication.

14. The device of claim 13, wherein the network interface comprises an interface to a public switched telephone network, integrated services digital network, local area network, or wireless local area network.

15. The device of claim 13, wherein the wireless transceiver comprises a DECT transceiver, Bluetooth transceiver, or IEEE 802.11 transceiver.

16. The device of claim 13, wherein the plurality of RSSI values are measured at either a headset or a headset base station.

17. The device of claim 13, wherein the donned/ditched threshold RSSI variation is a value above which the headset is in a donned status and below which the wireless headset is in a ditched status.

18. A computer readable storage memory storing executable program instructions that when executed by a computer cause the computer to perform a method for determining a wearing status of a body worn device:
    receiving a plurality of RSSI data;
    processing the plurality of RSSI data to determine a RSSI variation in the plurality of RSSI data;
    comparing the RSSI variation to a threshold RSSI variation; and
    generating a wearing status indication responsive to comparing the RSSI variation to the threshold RSSI variation.

19. The computer readable storage memory of claim 18, wherein the plurality of RSSI data is associated with RSSI data measured at either a body worn device or a body worn device base station.

20. The computer readable storage memory of claim 18, wherein the threshold RSSI variation is a value above which the body worn device is in a donned status and below which the body worn device is in a ditched status.

21. The computer readable storage memory of claim 18, wherein the body worn device is a headset.

22. The computer readable storage memory of claim 18, wherein determining a RSSI variation in the plurality of RSSI data comprises determining a standard deviation in the plurality of RSSI data.

23. The computer readable storage memory of claim 18, wherein determining a RSSI variation in the plurality of RSSI data comprises determining a variance in the plurality of RSSI data.

* * * * *